Jan. 18, 1927.
H. T. KRAFT
1,615,016
VALVE
Filed Sept. 21, 1925
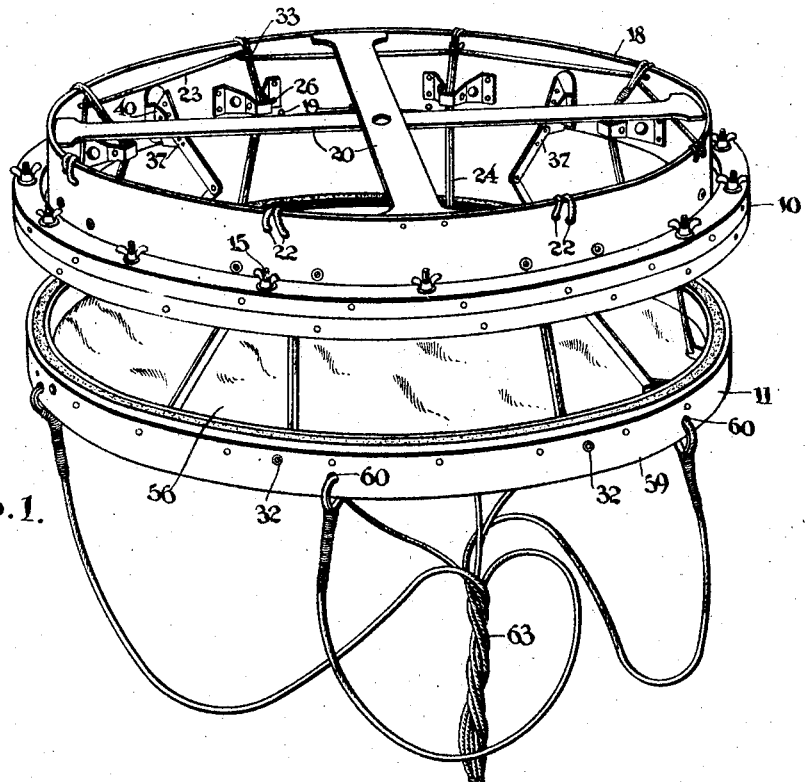
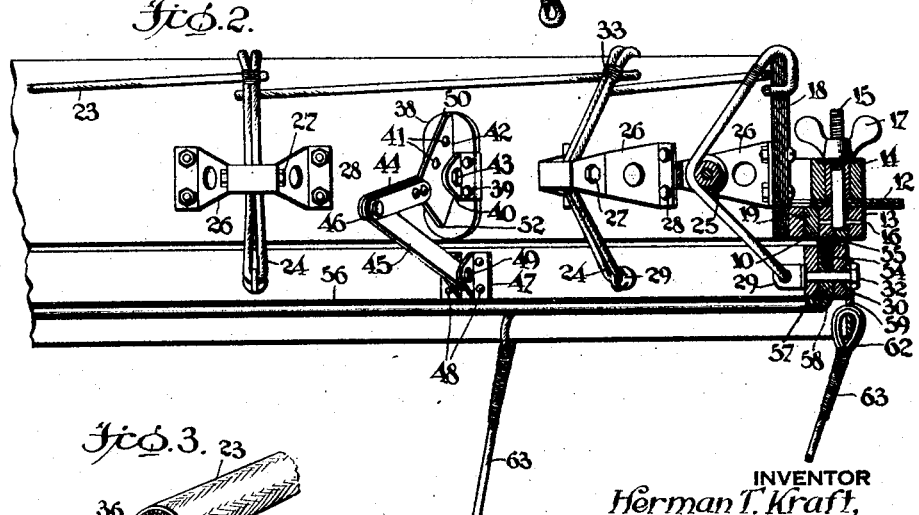
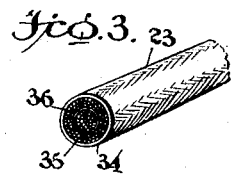
INVENTOR
Herman T. Kraft,
BY
ATTORNEY Patented Jan. 18, 1927.

1,615,016

UNITED STATES PATENT OFFICE.

HERMAN T. KRAFT, OF AKRON, OHIO, ASSIGNOR TO THE GOODYEAR TIRE & RUBBER COMPANY, OF AKRON, OHIO, A CORPORATION OF OHIO.

VALVE.

Application filed September 21, 1925. Serial No. 57,782.

My invention relates to valves and it has particular relation to fluid or gas valves adapted to be employed in connection with balloons or airships in which a lifting gas constitutes the buoyant power.

One object of my invention is to provide a gas valve which is composed of relatively light weight material and which is especially constructed to prevent the closure elements thereof from becoming displaced when the valve is closed.

Another object of my invention is to provide a gas valve which is adapted for use in controlling the gas pressure within various types of lighter-than-air craft and which includes an improved valve closing mechanism adapted to maintain a uniform contact between the closure elements of the valve when the latter is closed.

In the construction of valves of the above designated character which have been heretofore manufactured, difficulty has been encountered in providing yieldable closing mechanisms which possessed the desired qualities of lightness in weight and simplicity of operation and, at the same time, were capable of functioning properly under various conditions of aerial navigation. Generally, balloon valves have heretofore been constructed of two major annular members, one of which was connected to the balloon envelope and provided with some form of spring operated mechanism for drawing the other annular member into gas-tight engagement therewith. Metal diaphragms have been employed for covering the circular plane portion of the annular members.

It is the aim of my invention to provide a novel and improved means for drawing together the annular members of gas valves, and also to provide a device which will at all times maintain such annular members in proper alignment with each other. To this end I have provided aligned hinge members and an endless elastic cord, the latter of which is trained about the periphery of one of the annular members and is formed with loops which engage the closing member of the valve at regular intervals. A cord of this nature permits uniform contact of the valve closing elements, and is so arranged that adjustments may be made to accommodate various degrees of gas pressure. I have also provided a novel fabric diaphragm for one of the annular members which obviates the use of the heavier metal which has heretofore been used.

For a better understanding of my invention, reference may now be had to the accompanying drawings forming a part of this specification, of which—

Fig. 1 is a perspective view of a valve embodying my invention, and illustrating the operating parts thereof in opened position;

Fig. 2 is a fragmentary cross-sectional view of the valve shown in Fig. 1 on an enlarged scale showing in detail the principal features of my invention; and Fig. 3 is a fragmentary perspective view showing in detail the structure of an elastic cord employed in my invention.

In practicing my invention I have incorporated the features thereof in a valve which includes a composite annular member 10 and a cooperating axially aligned ring 11 which is axially movable with respect to the annular member. In order to provide a gas-tight engagement with a balloon envelope 12, I have provided upon the annular member 10, two laminated hard wood rings 13 and 14, of substantially the same diameter, which are adapted to receive the fabric envelope of the balloon therebetween in clamping relationship. The ring 13 is provided with bolts 15 secured at their lower ends rigidly in the ring by means of pins 16. The other ends of the bolts 15 are adapted to extend through the ring 14 and are threaded for the purpose of receiving wing nuts 17 which firmly clamp the edge of the envelope 12 between the rings.

An annular member 18 is secured to the inner periphery of the ring 13 by means of bolts or screws 19, and is of such axial width that one edge thereof extends beyond the clamping ring 14. Reinforcing braces 20 are disposed diametrically at right angles to each other across the top of the annular member 18.

Adjacent the top of the annular member 18, I have provided a series of regularly spaced pairs of small openings 22 adapted to receive an endless elastic cord 23, which extends over the edges of the annular member 18. The portions of the cord extending over the edges of the annular member are formed into loops 24 which are trained over rollers 25 rotatably mounted upon radially inwardly extending brackets 26 secured to the inner periphery of the annular member 18. The brackets 26 are each provided with a journal bolt 27 for supporting the roller 25 and are also provided with securing bolts 28 extending through the annular member 18. The purpose of the brackets 26 and rollers 25 is to prevent the elastic cord from frictionally engaging the surface of the ring 18 while the valve is being opened or closed.

The loops 24 of the cords extend downwardly and extend through openings at the ends of brackets 29, each of which is formed with a shank 30 extending through the ring 11. The brackets are held in place by means of nuts 32 threaded upon the outer end thereof.

It will be observed that the openings in the brackets 29 are sufficiently large to permit the cord 23 to slip freely therethrough in order that the various loops of the cord may be adjusted to exert a uniform force upon the ring 11. The loops are provided with clips 33 which prevent slipping of the cord after adjustment has been made.

As best shown in Fig. 2, the elastic cord 23 is composed of an extensible fabric sheath 34 which incloses a plurality of rubber strands 35. If desirable, a smaller fabric sheath 36 may be inclosed within the sheath 34 and embedded among the rubber strands. Since the extensibility of the fabric sheets 34 and 36 is limited, they serve to prevent excessive stretching of the rubber strands and thereby prolong the life thereof.

A plurality of connecting hinge members 37 are disposed at regularly spaced intervals within the periphery of the annular member 18 and are mounted upon brackets 38 secured to the inner periphery of the annular member 18 by means of bolts 39. As all of the hinge members are identical in structure, it is only necessary to describe one of them in detail. As best shown in Fig. 2, the bracket 38 is formed with ears 40 adapted to support a triangular rocking member 42 provided with openings 41, and pivoted upon a bolt 43 secured in the ears 40. The rockable member 42 has rigidly secured thereto an arm 44 of the hinge member 37. Another arm 45 is pivotally secured to the end of the arm 44 to form an elbow joint, as indicated at 46, and is connected at the other end to a bracket 47 secured to the lower ring 11. Conventional bolts 48 secure the bracket to the ring 11 and a bolt 49 pivotally supports the end of the arm 45. It will be observed that two corners 50 and 52 of the triangular member 42, are adapted to engage the bracket 38. Thus the operation of the hinge 37 is limited in both directions of axial movement of the rings 10 and 11, which serves to stabilize the rings in proper position, and prevents them from becoming displaced.

Since the degree of separation of the annular member 10 and the ring 11 is controlled by the hinge members 37, this separation may be varied by adjusting the rocking member 42 by means of mounting the bolt 43 in any of the openings 41.

The lower hard-wood ring 11 is formed with a concentric groove 54 and is adapted to receive therein a rubber annulus 55, which serves the function of providing a gas-tight closure between the rings 11 and 13. The lower part of the ring 11 is provided with a flexible diaphragm 56 composed of balloon fabric or similar material impervious to gas, which is secured by means of a ring 57 and screws 58 clamping the diaphragm of the ring 11.

A reinforcing metal ring 59 encircles the ring 11 and is secured thereto by means of the bracket bolt 30. This metal ring extends below the ring 10 and is provided with a plurality of openings 60 adapted to receive loops 62 of a valve operating cord or cable 63.

From the foregoing description, it will be apparent that the valve mechanism comprising my invention has many advantages such as simplicity of construction and operation and that the probability of displacement of any of the operating parts is reduced to a minimum. Manipulation of the cables or cords 63 to separate the valve rings 11 and 13 is yieldably resisted by the elastic cords 23 and the hinge members 37, in conjunction with the cords, maintain the annular members of the valve in direct axial alignment. Upon release of the cable 63 the elastic cords draw the ring 11 toward the ring 13 until the rubber annulus 55 effects a sealing engagement against the ring 13.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A valve mechanism comprising two cooperating annular members, one of said members being composed of wood, and a reinforcing band secured to the last named member.

2. A valve mechanism comprising two cooperating annular members, one of said members being composed of wood, and a metal reinforcing band secured to one of said members.

3. A valve mechanism comprising two cooperating annular members, one of said members being formed of laminated hard wood, and a reinforcing band secured to the outer periphery of one of said members.

4. A balloon valve comprising two annular members composed of laminated fibrous material, a reinforcing band on one of said members, and a fabric diaphragm secured to one of said members.

5. A balloon valve comprising two annular members composed of fibrous material, a metal band surrounding one of said members, a continuous member extending substantially circumferentially of the annular members and alternately engaging the latter to draw them together.

6. A valve mechanism comprising two annular members, and an elastic cord engaging the annular members at intervals and tending to maintain the valve closed.

7. A valve mechanism comprising two annular members, and a continuous elastic cord engaging the annular members at uniformly spaced intervals.

8. A valve mechanism comprising two annular members, and a continuous elastic cord secured to the annular members at spaced intervals, said cord being adjustable to maintain uniform pressure between the contacting parts of the valve.

9. A balloon valve comprising two annular members, one of said members being adapted to be connected to the envelope of a balloon, and a continuous elastic cord provided with loops passing through spaced openings formed in one of the annular members, the loops being connected to the other annular member of the valve.

10. A balloon valve comprising two annular members, a continuous elastic cord formed with loops connected at intervals adjacent the periphery of one of the members, means for connecting the loops to the other annular member and means for adjusting the cord with respect to the annular members to maintain uniform contact between the valve engaging parts.

11. A balloon valve comprising two annular members, a continuous cord secured adjacent the periphery of one of the members and connected at intervals to the other member, and brackets carrying rollers engaging the cord secured to the inner periphery of one of the members.

12. A closing mechanism for balloon valves comprising a continuous elastic cord secured at intervals to the valve parts, the elastic cord and valve being adjustable relative to each other to maintain constant pressure at all points of contact between engaging parts of the valve when the same is closed.

13. A balloon valve comprising two annular members, a continuous elastic cord engaging the members at intervals and tending to maintain them in closed relationship, spaced hinge members connecting the annular members, and a rocking member provided at one end of each elbow member, and means for limiting the rocking movement of the latter.

14. A valve mechanism adapted to be secured to the envelope of a balloon, comprising a supporting member, an annular member cooperating therewith, a reinforcing metal band surrounding the annular member, a continuous elastic cord connected at intervals to the annular member and to the supporting member and hinge means for limiting the rocking movement of the rocking members.

15. A balloon valve comprising an annular member adapted to be secured to a balloon envelope, a circular member adapted to engage said annular member to effect a sealing engagement therewith, and a plurality of hinge members connecting said members, each of said hinge members being adapted to permit movement in one plane only and being mounted so as to permit movement in an axially extending radial plane only.

In witness whereof, I have hereunto signed my name.

HERMAN T. KRAFT.